(12) United States Patent  (10) Patent No.: US 6,328,322 B1
Pierce  (45) Date of Patent: Dec. 11, 2001

(54) DRIVE AXLE SUSPENSION (75) Inventor: William C. Pierce, Muskegon, MI (US)

(73) Assignee: Holland Neway International, Inc., Muskegon, MI (US)

( * ) Notice: Subject to any disclaimer, the term of this patent is extended or adjusted under 35 U.S.C. 154(b) by 0 days.

(21) Appl. No.: 09/559,000

(22) Filed: Apr. 24, 2000

Related U.S. Application Data (63) Continuation of application No. PCT/US99/19682, filed on Aug. 26, 1999.
(60) Provisional application No. 60/098,164, filed on Aug. 27, 1998.

(51) Int. Cl.⁷ ...................................................... B60G 3/16
(52) U.S. Cl. ............................. 280/124.131; 280/124.156; 280/124.167
(58) Field of Search .................... 280/677, 678, 280/683, 685, 124.111, 124.128, 124.131, 124.13, 124.132, 124.158, 124.153, 127.167, 124.156

(56) References Cited

U.S. PATENT DOCUMENTS

| 3,473,821 | * | 10/1969 | Barenyi et al. . | |
| 4,434,998 | * | 3/1984 | Kaltwasser | 280/721 |
| 4,740,011 | * | 4/1988 | Mitobe et al. | 280/690 |
| 4,995,636 | | 2/1991 | Hall et al. . | |
| 5,039,124 | * | 8/1991 | Widmer | 280/711 |
| 5,203,585 | | 4/1993 | Pierce . | |
| 5,366,237 | * | 11/1994 | Dilling et al. | 280/711 |
| 5,409,254 | | 4/1995 | Minor et al. . | |
| 5,785,345 | | 7/1998 | Barlas et al. . | |
| 5,924,712 | * | 7/1999 | Pierce | 280/124.13 |
| 6,089,583 | * | 7/2000 | Taipale | 280/124.13 |

FOREIGN PATENT DOCUMENTS

| 928 813 | 6/1955 | (DE) . |
| 43 38 651 A1 | 3/1995 | (DE) . |
| 0 457 962 A2 | 11/1991 | (EP) . |
| 0 502 310 A1 | 9/1992 | (EP) . |
| 0 636 531 A2 | 2/1995 | (EP) . |

* cited by examiner

Primary Examiner—Paul N. Dickson
(74) Attorney, Agent, or Firm—Rader, Fishman, Grauer & Mc Garry (57) ABSTRACT A drive axle suspension for maintaining a differential pinion gear at a substantially constant position in response to engine torque induced or vehicle roll induced twisting forces acting on the differential axle housing. The drive axle suspension comprises a trailing arm having one end pivotally mounted to the vehicle through a hanger bracket, depending from a frame rail of the vehicle, and another end connected to the vehicle frame rail through an air spring. The trailing arms have a blade-like configuration that permits the blades to twist longitudinally and bend laterally to relieve the axle twisting forces that would otherwise rotate the differential and undesirably rotate the pinion gear, changing its angular orientation.

30 Claims, 5 Drawing Sheets

DRIVE AXLE SUSPENSION

CROSS-REFERENCE TO RELATED APPLICATION

This application is a continuation of PCT International Application Number PCT/US99/19682 filed Aug. 26, 1999, which claims the benefit of U.S. Provisional Application Ser. No. 60/098,164, filed Aug. 27, 1998.

BACKGROUND OF THE INVENTION

1. Field of the Invention

This invention relates to a drive axle suspension; and, more particularly, to a heavy-duty drive axle suspension capable of maintaining a substantially constant pinion gear angle while flexing to permit operationally sufficient independent movement of wheels coupled to the suspension.

2. Description of the Related Art

Heavy-duty truck drive axle suspensions typically comprise a pair of trailing arm suspension assemblies, each mounted parallel to and spaced from frame rails in the truck chassis. Each trailing arm suspension assembly comprises a trailing arm having one end pivotally mounted to a hanger bracket, which is rigidly mounted to one of the frame rails, and an air spring connecting the other end of the trailing arm to the frame rail. The suspension assemblies carry a drive axle differential comprising a housing from which extends a pinion gear and axle housings, containing the axle shafts. The axle housings connect the differential to the trailing arms through axle brackets. The pinion gear is connected to the engine through the drive shaft. The axle shafts mount the wheels and are driven by the engine through the connection between the drive shaft, pinion gear, and axle shaft.

A trailing arm suspension of this type translates road forces imparted to the wheels into a rotational movement of the trailing arms relative to the hanger brackets. The rotational movement of the trailing arm is cushioned by the air spring positioned between the end of the trailing arm and the frame rail.

A common design problem for drive axle suspensions is to keep the pinion gear parallel to the engine output shaft. The torque applied to the pinion gear from the engine through the drive shaft, results in torque applied to the drive tires which results in tractive effort being applied to the ground through the tire contact area. The reaction to the torque from the drive tires is a torque in the drive axle housing along its lateral axis, which is clockwise when viewed from the left side of the vehicle. This torque, when coupled to a single pivot suspension, tends to raise the forward end of the trailing arm and thus raises the frame a few inches with respect to the axle. This height rise changes the pinion angle dramatically.

The torque induced pinion angle change is exacerbated by newer high horsepower, high torque engines that produce substantially greater torque at lower rpms than previous engines. The new engines produce such high torque at such low rpms that each piston firing can result in a spike in the torque loading of the drive line components extending from the engine to the pinion gear of the differential. The magnitude of the torque load, in conjunction with a single pivot suspension, can alter the pinion angle dramatically, which sets up vibrations in the entire drive train. To prevent damage to drive line components and eliminate vibration, it is necessary to keep the pinion angle within predetermined limits.

One attempt to maintain the pinion angle at a substantially constant angle stiffened the suspension to prevent rotation around the suspension pivot in response to the torque reaction lifting force on the drive axle. One solution adds springs to the shock absorbers to prevent frame rise and subsequent pinion angle change.

The stiffening of the suspension to prevent the rotation of the axle housing can give rise to some additional undesirable operational characteristic. The suspension can be so stiff that it will reduce axle travel and, when the vehicle is lightly loaded and traversing slightly uneven ground, it may lose traction. Further, the spring in the shock absorber changes the ride characteristics and decreases the suspension's response over rough roads.

Therefore, it is desirable to have a drive axle suspension that maintains a substantially constant pinion angle while providing sufficient suspension flexibility to ensure the best possible performance and durability.

SUMMARY OF THE INVENTION

The invention relates to a drive axle trailing arm suspension adapted to support a drive axle. The drive axle comprises a differential housing having opposing drive axle housings, each containing a drive axle. The drive axles connect to a pinion gear through other gearing. The pinion gear forms an angle relative to the vehicle chassis and operably couples to a vehicle drive shaft for transferring engine torque to the drive axles through the differential.

The drive axle suspension preferably comprises a pair of trailing arm assemblies adapted to mount to opposite sides of a vehicle and support the drive axle housings. Each of the trailing arm assemblies comprises a trailing arm having a longitudinal axis. A first portion of the trailing arm is adapted to pivotally mount to a vehicle frame, preferably through a vehicle frame bracket, for pivotal movement in a generally vertical plane. An air spring is positioned between a second portion of the trailing arm and a vehicle frame for load support and pivotal movement of the trailing arm in the vertical plane. The drive axle trailing arm suspension further includes a torsion bar extending between the trailing arms. The trailing arms each have a blade-shaped beam capable of twisting about the trailing arm longitudinal axis substantially follow the motion of the attaching parts.

Preferably, the blade-shaped beam has a generally rectangular transverse cross section, which can vary over a wide range depending on the requirements of the suspension. The blade-shaped beam should be rigid in a vertical direction and flexible in a lateral direction. In general, the blade-shaped beam can have a height to thickness ratio in the range 6 to 20. The width of the transverse cross section is preferably ⅜ inch to ¾ inch, and the height is preferably 3 inches to 10 inches. The blade-shaped beam also has a yield strength of 60,000 psi to 180,000 psi. It is preferred that the blade-shaped beam be made from high-strength steel.

The torsion bar is preferably connected to the trailing arms by shrink fitting portions of the torsion bar within openings in each of the trailing arms. Each trailing arm assembly can further include an axle bracket that is adapted to mount an axle housing. The axle bracket is mounted to the trailing arm by a bushing assembly, where an outer sleeve of the bushing assembly is preferably shrunk-fit within an opening in the trailing arm. A second bushing assembly is preferably used to pivotally connect the trailing arm to a vehicle frame, generally through a hanger bracket. The second bushing assembly outer sleeve is preferably shrunk-fit within an opening in the trailing arm.

In one embodiment, a control arm has one end adapted to pivotally mount to a vehicle frame through the hanger bracket or other frame bracket and has a second end pivotally mounted to the axle bracket or the axle to form a parallelogram trailing arm assembly. There may be one control arm on one side or in the center, or two control arms, one on each side. Preferably, each axle bracket assembly is pivotally mounted to the trailing arm at a single point of rotation.

In another embodiment, the trailing arm assemblies can comprise a linkage connecting the torsion bar and a portion of a vehicle frame. The linkage preferably comprises an arm and a link connected by bushing assemblies. The arm comprises a first portion having an opening through which the torsion bar passes and a second portion having an opening in which the bushing assembly is received. The link has one portion connected to the bushing assembly and another portion adapted to connect to a vehicle frame. Preferably, the torsion bar is pressed within the arm first portion opening and a sleeve of the bushing assembly is shrunk-fit within the arms second portion opening. The linkage can include a second link spaced from and parallel to the first link.

In addition to the torsion bar extending between the trailing arms, a cross plate can span the trailing arms a spaced distance from the torsion bar. Preferably, the cross plate is mounted to a peripheral portion of each trailing arm.

DETAILED DESCRIPTION OF THE PREFERRED EMBODIMENTS

Figure 1:
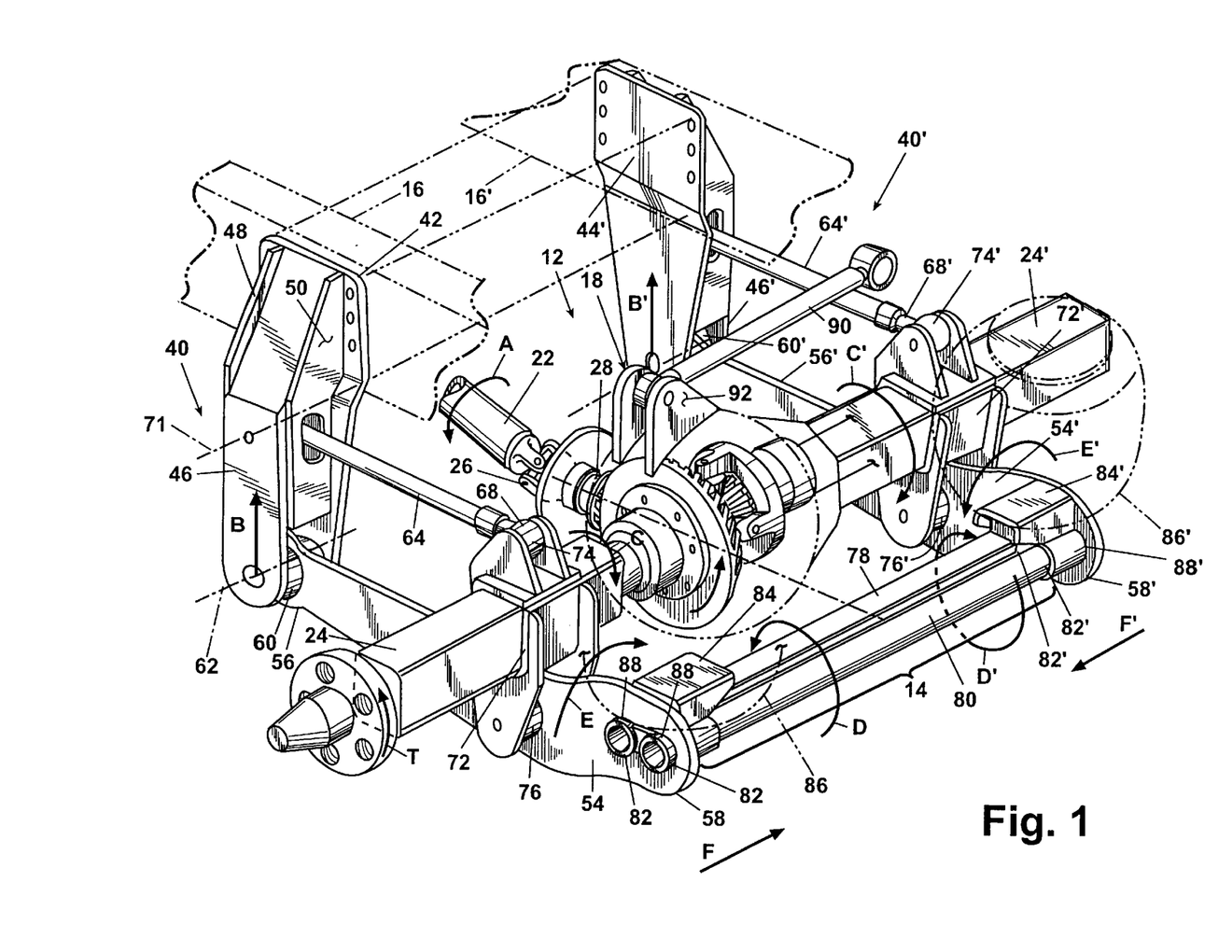
FIG. 1 is a perspective view of a drive axle suspension according to the invention supporting a differential connected to a vehicle drive shaft by a pinion gear.
Figure 2:
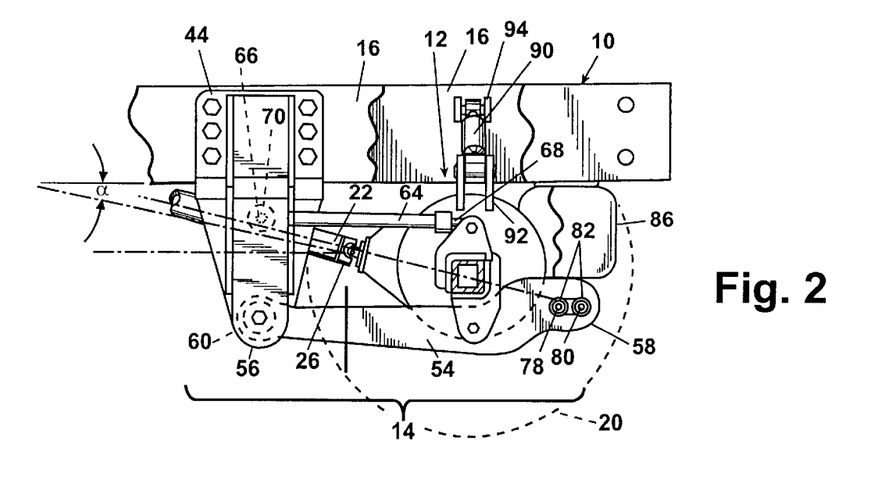
FIG. 2 is a side view of the drive axle suspension of FIG. 1 illustrating an angle that the pinion gear forms relative to the frame.

FIGS. 1 and 2 illustrate a portion of a heavy-duty vehicle chassis 10 having a drive system 12, which is suspended from the vehicle chassis 10 by a drive axle suspension 14 according to the invention. The vehicle chassis 10 comprises a pair of spaced and longitudinally oriented frame rails 16 and 16'. Because of the symmetrical nature of the chassis 10, drive system 12, and suspension 14, with complementing elements for the left and ride sides of the vehicle, unless otherwise required for clarity, only one of the elements will be described in detail and the complementary element will be identified with the superscript'.

Figure 3:
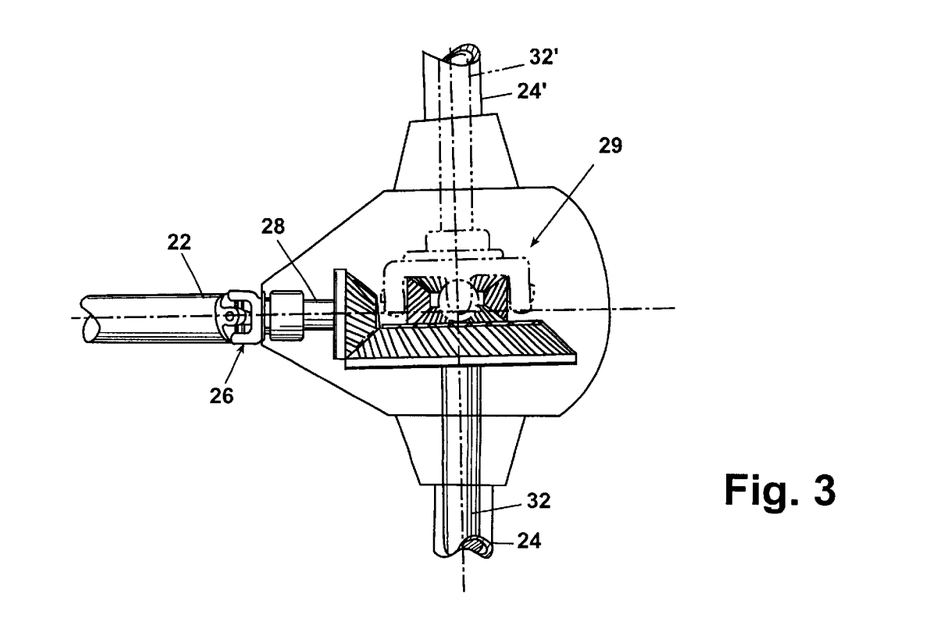
FIG. 3 is a top view of the differential and drive shaft connection.

The drive system 12 comprises a rear differential 18 connecting the engine (not shown) to ground engaging wheels 20 by a drive shaft 22 extending from the transmission to the differential 18 and axle housings 24, 24' extending from the differential 18 to the wheels 20. The drive shaft 22 connects to the differential 18 by a universal joint 26 connected to a pinion gear 28 (FIG. 3) of the differential 18. The pinion gear 28 mounts to drive gears 29 contained within the interior of the differential 18, which rotate axle shafts 32, 32' contained within the axle housings 24 and 24'. Thus, when the drive shaft 22 is driven by the engine, the rotational motion of the drive shaft is transferred to the wheels through the pinion gear 28 of the differential 18.

The pinion gear 28 has a longitudinal axis that forms an angle α relative to the frame (the pinion angle). From an operational standpoint, it is important that the pinion gear in the lead drive axle be maintained essentially parallel to the transmission output shaft. For this reason, pinion gears are operationally constrained so that the pinion angle is maintained within a predetermined angular range to ensure minimum vibration and maximum durability. If the pinion gear moves out of the predetermined operational range, possible damage to the drive line components may result, especially from pulsating torque loads.

The drive axle suspension 14 comprises substantially identical suspension assemblies 40 and 40'. Only one of the suspensions 40, 40' will be described with it being understood that the description applies to both. The suspension assembly 40 comprises a hanger bracket 42, which includes an inner plate 44 and an outerplate 46, connected to the inner plate 44 by a front side plate 48 and rear side plate 50.

The suspension assembly 40 further comprises a trailing arm 54 having a first end 56 and a second end 58. The first end of the trailing arm 54 is pivotally connected to the hanger bracket 42 by a bushing assembly 60, which permits rotation of the trailing arm 54 about a rotational axis 62. The bushing assembly 60 is well known in the art and comprises an outer sleeve in which is slidably press-fit an elastomeric bushing.

The trailing arm 54 is a blade beam having a relatively narrow thickness (⅝ inch) as compared to its length and height (9 inches). The relatively narrow thickness provides the blade beam with a cross section that permits some twisting about a longitudinal axis extending from the first end 56 to the second end 58 and some lateral deflection, while substantially preventing deflection of the trailing arm 54 about an axis transverse to the longitudinal axis of the beam.

The suspension assembly 40 further comprises a control arm 64 having a first end 66 and a second end 68. The first end 66 is rotatably connected to the hanger bracket 42 by a spherical ball joint 70 for rotation about axis 71.

Axle bracket 72 connects to the control arm 64 and the trailing arm 54 and mounts the axle housing 24 of the differential 18. The second end 68 of the control arms 64 is mounted to an upper portion of the axle bracket 72 by a spherical ball joint 74. The axle bracket 72 is mounted to the trailing arm 54 by a single bushing assembly 76.

The trailing arm 54, control arm 64, hanger bracket 42 and axle bracket 72 define a nearly parallelogram suspension. The bushing assemblys 60, 76 and ball joints 70, 74 define the corners of the near parallelogram structure. The length of trailing arm 54 between the centerlines of the bushing assembly 60 and 76 of the trailing arm 54 and the length of arm 64 between the ball joints 70 and 74 of the control arm 64, but the vertical distance between the ball joint 74 and bushing assemblies 76 (at the axle bracket) is shorter than the vertical distance between the ball joint 70 and bushing assembly 60 (at the hanger bracket 42). The difference in the vertical spacing induces torque into differential 18 when the trailing arm 54 and control arm 64 rotate in an arc that is the opposite to the arc of trailing arm 54' and control arm 64', and this induced torque resists vehicle roll along its longitudinal axis.

A pair of torsion bars 78, 80 extend between the second ends 58, 58' of the trailing arms 54, 54'. The torsion bars 78, 80 are mounted to the second ends 58, 58' of the trailing arms 54, 54' through sleeves 82, 82' which are rigidly fit into openings 88, 88' in the trailing arms 54, 54'.

An air spring support plate 84 is mounted at the second end 58 of the trailing arm 54 and mounts a lower end of air spring 86. The upper end of the air spring 86 is mounted to the frame rail 16. An air spring support plate 84' is mounted to the second end 58' of the trailing arm 54 and mounts a lower end of air spring 86'.

A control rod 90 extends from a bracket 92 on the differential 18 to a bracket 94 on the frame rail 16'. The control rod 90 maintains lateral position of the suspension with respect to the frame.

In operation, as the engine rotates the drive shaft 22 in the direction of the arrow A, a corresponding torque is applied to the pinion gear 28 through the universal joint 26, and ultimately to the differential. The torque applied by the drive shaft to the differential rotates the wheels 20 about a counterclockwise direction as viewed in FIGS. 1 and 2. The force of the wheels against the ground introduces a torque C and C' on the axle housings 24 and 24', respectively. The torque C is resolved into horizontal forces along the control arms 64, 64' and along the trailing arms 54, 54'. Because the control arms 64, 64' and the trailing arms 54, 54' are essentially horizontal, there is essentially no vertical component in the trailing arm resulting from the torque C and C'. Thus, vertical movement of the trailing arm and the frame with respect to the wheels is essentially avoided. Even if there were a component of vertical force resulting from torque C and C', the relationship between the pinion gear and the frame remains the same because of the near parallelogram formed by the trailing arm 54, control arm 64, hanger bracket 42 and axle bracket 72.

The balance between the needed operational twisting and deflection of the trailing arms 54, 54' is accomplished by using the blade trailing arms for longitudinal twisting and lateral deflection in combination with the torsion bars and the control arms for limiting the longitudinal twisting and lateral deflection. The longitudinal twisting is predominately defined by the motion of the axle and torsion bars. The location of the torsion bars effectively increases the bending modulus of each blade trailing arm about the longitudinal axis. The torsion bars also couple the lateral movement of both blades, which tends to reduce twisting induced lateral movement since the lateral forces F, F' are opposing. The lateral deflection is limited by control rod 30 along with the inherent play in the ball joints connecting the control arms to the axle and frame.

The torsional rigidity of the trailing arm must be selected such that the trailing arm provides the needed amount of twisting and bending to relieve the torque-induced forces, but not fail. The torsional rigidity is a function of the cross-sectional shape of the blade trailing arm and the material characteristics of the trailing arm. To provide the necessary bending and twisting of the suspension components, it is preferred that high-strength steel be used for most of the components. For example, it is preferred that the trailing arms have a yield strength of approximately 100,000 psi and the torsion bars have a yield strength of approximately 150,000 psi. The advantage of the suspension according to the invention is that the pinion angle α is maintained substantially constant without increasing the size of the various suspension components in an attempt to increase the stiffness of the suspension. Moreover, the suspension according to the invention takes an opposite approach by reducing the stiffness typically found in the various components of this type of suspension by using the blade-like trailing arms and using flexible connections, such as bushing assemblies and ball joints, to connect the various suspension components to the drive system.

It is also important to the invention that the connection of the various suspension components to the trailing arms 54, 54' do not slip, which would potentially prevent the trailing arms from twisting or bending to relieve the torque induced forces, or create stress concentration areas, which could lead to premature failure of the trailing arms 54, 54' or other components. It is preferred that the various components be connected by a shrink fitting. For example, the sleeves of the bushing assemblies 60, 76 and the sleeves 88 are shrunk-fit into the trailing arm.

The approach of making the suspension more flexible has a two-fold advantage. First, the suspension is much lighter than previous suspensions which faced the same problem of maintaining the pinion angle substantially constant in response to high torque loads applied by the newer high horsepower, low rpm engines. The reduced weight over previous suspensions results in overall improved performance including greater load capacity and increased fuel mileage. Second, these benefits are obtained while still keeping the suspension flexible enough so that there is sufficient independent movement between the wheels 20, 20' to make sure the wheels remain in contact with the road surface on uneven surfaces and providing more predictable, consistent roll characteristics.

Figure 4:
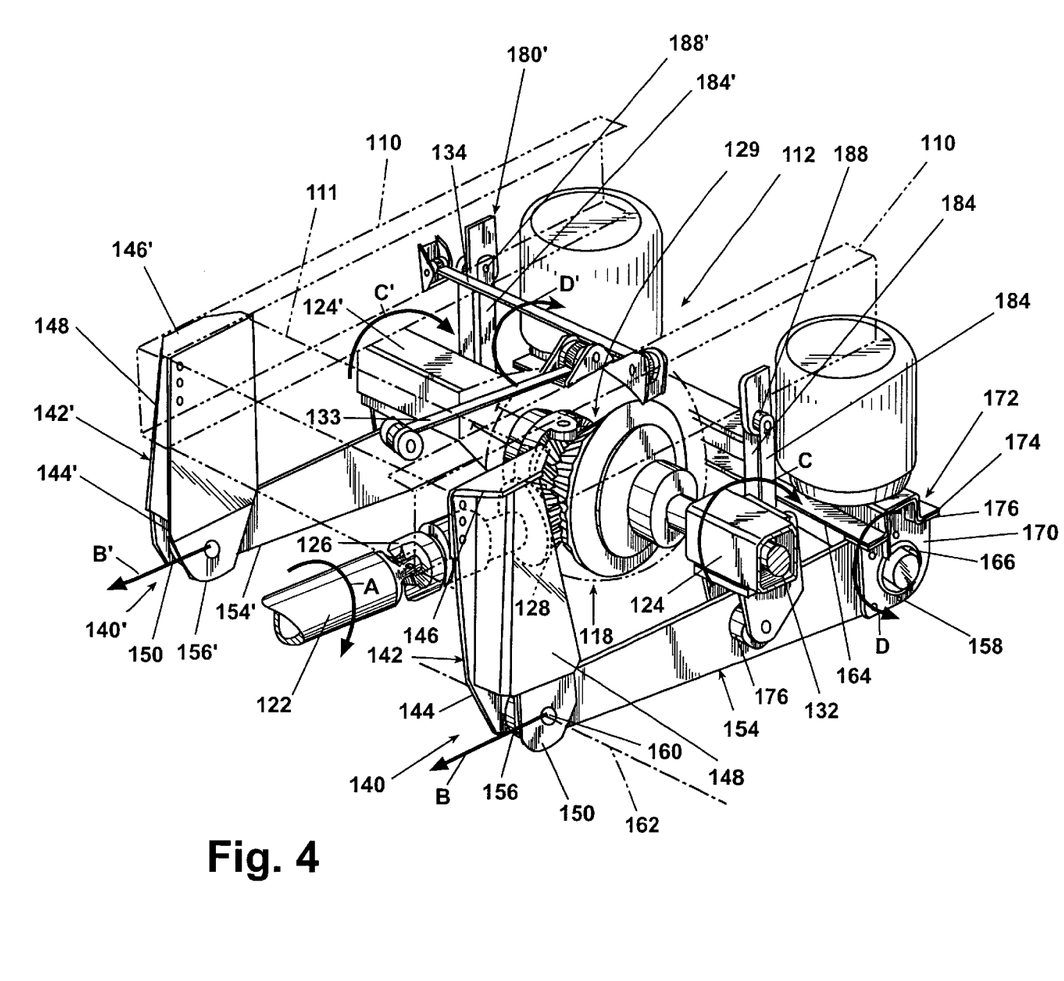
FIG. 4 is a left-front perspective view of a second embodiment drive axle suspension according to the invention.
Figure 5:
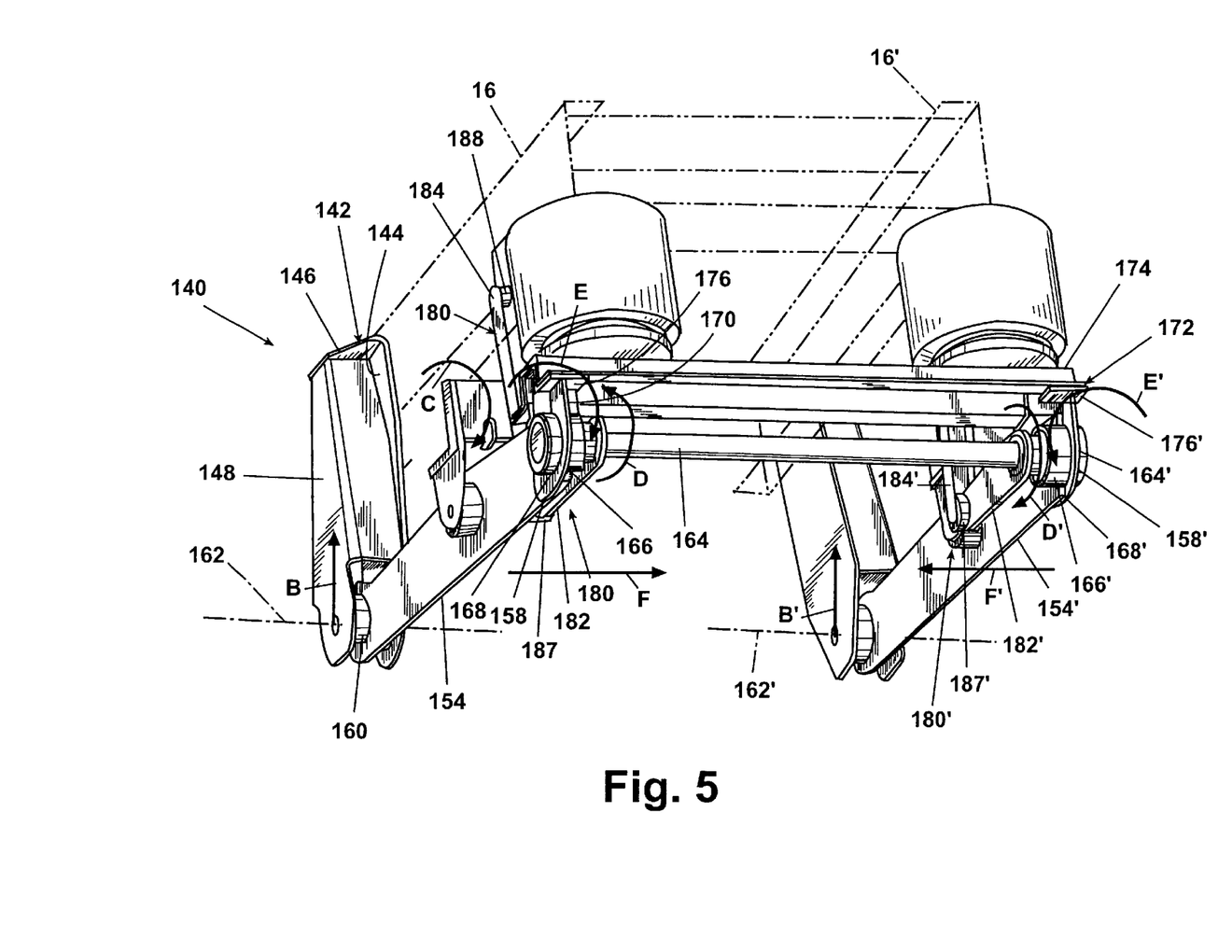
FIG. 5 is a lower rear perspective view of the second embodiment suspension of FIG. 4.
Figure 6:
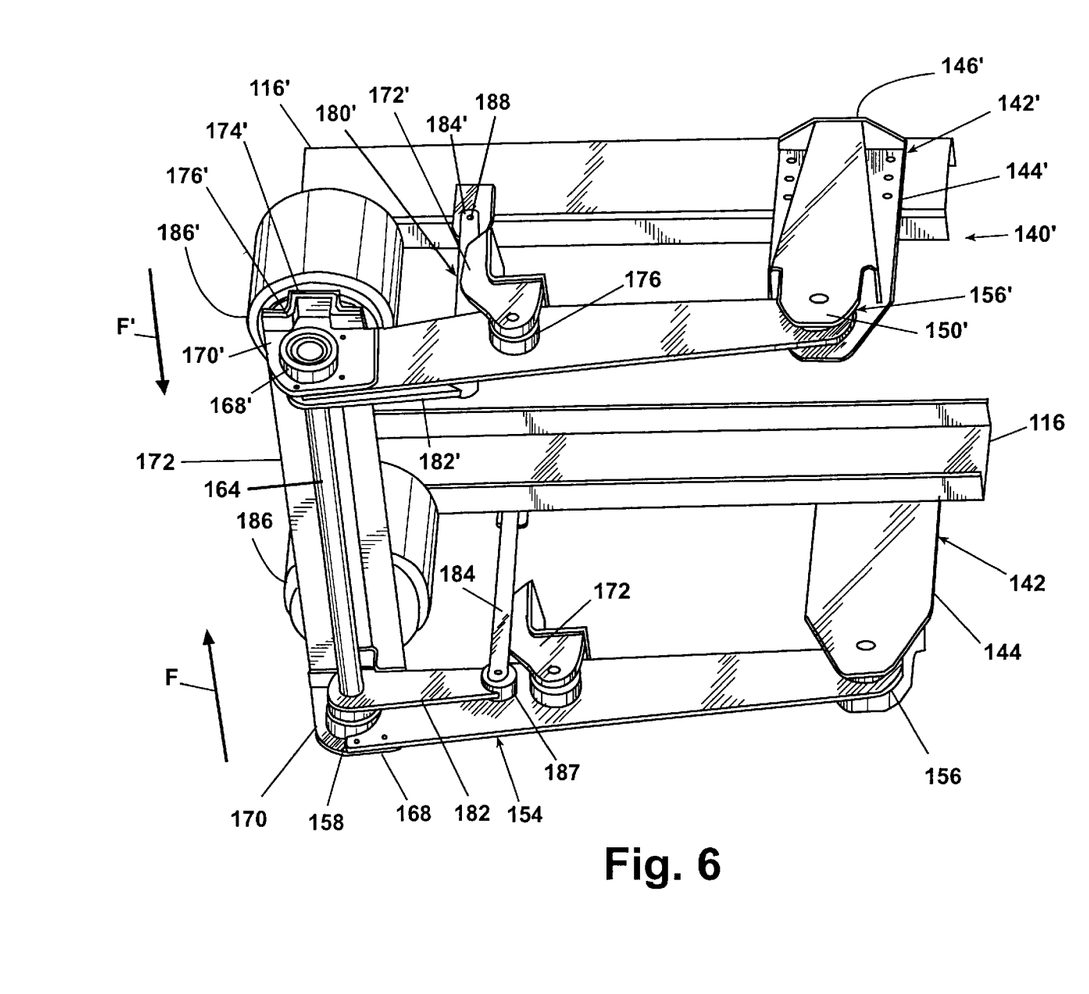
FIG. 6 is a lower side perspective view of the drive axle suspension of FIG. 4.

Referring now to FIGS. 4–6, a portion of a heavy-duty vehicle chassis 110 is shown with a drive system 112, which is suspended from the vehicle chassis 110 by a second embodiment drive axle suspension according to the invention. The chassis 110 and drive system 112 for the second embodiment drive axle suspension are substantially similar to the chassis 10 and drive system 12 of the first embodiment. Similarly, the second embodiment drive axle suspension has some common components with the first embodiment 14. Therefore, the description of the second embodiment will, where appropriate, reference similarities and differences between the first and second drive axle suspensions.

The drive system 112 comprises a rear differential 118 connected to a cross member 111 by a torque rod 133 and one of the frame rails by a track bar 134. As with the differential 18, the differential 118 also comprises a drive shaft 122 connected to a pinion gear 128 by a universal joint 126. The pinion gear is enmeshed with drive gears 129, which are coupled to axle shafts 132, 132' contained within axle 25 housings 124, 124'. When the drive shaft 122 is driven by the engine, the rotational motion of the drive shaft is transferred to the wheels through the pinion gear, drive gears 129, and axle shafts 132, 132'.

The drive axle suspension shown in FIGS. 4–6 comprises substantially identical suspension assemblies 140 and 140'. As with the first embodiment, unless otherwise required, only one of the suspension assemblies 140, 140' will be described in detail. The suspension assembly 140 comprises a hanger bracket 142 comprising a generally planar back plate 144 having an outwardly turned lip 146 and a front, U-shaped plate 148 having a depending flange 150.

The suspension assembly 140 further comprises a trailing arm 154 having a first end 156 and a second end 158. The first end 156 is pivotally mounted between the depending flange 150 and the back plate 144 of the hanger bracket 140 for rotation about a rotational axis 162.

A torsion bar 164 (FIGS. 5 and 6) extends between the second ends 158, 158' of the trailing arms 154, 154' and is secured thereto by bushing assemblies 166, 166'. The bushing assemblies 166, 166' are well know and typically comprise an outer sleeve and an elastomeric bushing that is slidably or press-fit within the sleeve. The bushing assemblies 166, 166' are received within an open-sided recess 168, 168' in the second ends 158, 158' of the trailing arms 154, 154'. A torsion bar mounting bracket 170, 170' is mounted to each of the trailing arms 154, 154' by bolts or other suitable fasteners and receives the bushing assemblies 166, 166'.

A hat section 172 comprising a transverse U-shaped beam 174 whose ends are mounted to the torsion bar mounting brackets 170, 170' by plates 176, 176' spans the trailing arms 154, 154' to couple the second ends 158, 158' of the trailing arms 154, 154' along with the torsion bar 164. The hat section provides a support for mounting a pair of air springs 186, 186' between the trailing arms 154, 154' and the frame 16, 16'. In this manner, the hat section functions to support vertical loads directed into the beam from the suspension because of the mounting of the air springs between the hat section and the frame.

A link assembly 180, 180' couples the torsion bar 164 to each of the frame rails 116, 116'. Each of the link assemblies 180, 180' comprises an arm 182, 182' coupled to the torsion bar 164 and a set of parallel links 184, 184' coupled to the arm 182, 182' and the frame 116, 116'. The arm 182 has one end shrunk fit to the torsion bar 164 and the other end is connected to the pair of parallel links 184, 184' by an bushing assemblies 187, 187'. The other ends of the parallel links 184, 184' are connected to the frame 16, 16' by bushing assemblies 188, 188'.

The shrink-fitting of one end of the arm 182, 182' to the torsion bar 164 and the other end of the arm 182, 182' connected to the end of the parallel links 184, 184' by an bushing assemblies 187, 187' permits any twisting of the torsion bar 164 to be translated into a rotational movement about the bushing assemblies 187, 187' whose vertical position is fixed by the parallel links 184, 184'.

The operation of the second embodiment drive axle suspension is similar to the first embodiment drive axle suspension 10 in that the drive shaft 122 applies a torque A to the differential 118, which tends to apply a torque C, C' to the axle housing which is applied to the frame brackets as force B.

The relative rotation of the trailing arm 154 to the trailing arm 154' from chassis roll results in the creation of opposite forces in links 184 and 184' which react on the frame rails 116 and 116' to provide a restoring force which resists vehicle roll. The trailing arms 154 and 154' flex along their longitudinal axes so that the torsion bar 164 moves angularly relative to the chassis 110 in a lateral plane without overstressing bushings 166, 166'.

In the second embodiment, the torsion bar 164 alone and in combination with the hat section tend to resist the tendency of the trailing arms 154, 154' to move independently, while still permitting a sufficient amount of twisting to relieve the torque A induced forces on the suspension.

The link assemblies 180, 180' also tend to retard the twisting of the trailing arms 154, 154' in that the link assemblies 180, 180' permit rotation of the arm 182, 182' relative to the parallel links 184, 184' in the same direction as the rotation of the trailing arms 154, 154'. However, the parallel links 184, 184' effectively limit the vertical movement of the bushing assemblies 187, 187', connecting the arms 182, 182' to the parallel links 184, 184'. The effective vertical limiting of the bushing assemblies 187, 187' transfers into the link assembly 180, 180' to effectively retard the relative rotation of the trailing arms 154, 154' and resist vehicle roll. As with the first embodiment, the second embodiment drive axle suspension effectively maintains the pinion gear 128 in a relatively fixed angular position with respect to the frame regardless of the magnitude of the torque A. The drive axle suspension accomplishes this function by the parallelogram created by the trailing arm 154, 154' and the torque rod 133. Any lifting of the frame with respect to the axle will maintain the axle at the same angular orientation with respect to the frame. Further, the horizontal positioning of the trailing arms 154, 154' and the torque rod 133 resolves the torque C, C' components in an essentially horizontal direction. The torque C, C' results in a horizontal tensile force on torque rod 133 and a horizontal compressive force on the trailing arms 154, 154' between the bushing assemblies 176 and 156. Thus, there is essentially no vertical rise of the frame 110 with respect to the axle 132 as a result of the application of torque A and C.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. In a drive axle trailing arm suspension assembly supporting a rigid drive axle comprising a differential having opposing axle shafts mounted to the differential and connected to a pinion gear contained within the differential, the pinion gear forms an angle relative to the ground and is coupled to a drive shaft for transferring torque from an engine to the axle shafts through the differential, the drive axle trailing arm suspension comprising:

a pair of trailing arm assemblies adapted to mount to opposite sides of a vehicle and support the drive axle housings, each trailing arm assembly comprising a trailing arm having a longitudinal axis and a first portion adapted to be mounted to a vehicle frame for pivotal movement in a generally vertical plane, an air spring positioned between a second portion of the trailing arm and a vehicle frame for resiliently resisting the pivotal movement of the trailing arm, and a torque rod extending between the trailing arms, the drive axle mounted to the trailing arm between the first and second portions of the trailing arm, the improvement comprising:

each trailing arm comprising a blade-shaped beam capable of twisting about the trailing arm longitudinal axis for flexibility of the axle with respect to the vehicle frame other than in the vertical plane.

2. The drive axle suspension assembly according to claim 1 wherein the blade-shaped beam has a generally rectangular transverse cross section.

3. The drive axle suspension assembly according to claim 2 wherein the transverse cross section has a height to width ratio of 6 to 20.

4. The drive axle suspension assembly according to claim 3 wherein the width of the transverse cross section is ⅜" to ¾".

5. The drive axle suspension assembly according to claim 4 wherein the height of the transverse cross section is in the range of 3" to 10".

6. The drive axle suspension assembly according to claim 1 wherein the blade-shaped beam has a yield strength of 64,000 psi to 180,000 psi.

7. The drive axle suspension assembly according to claim 6 wherein the blade-shaped beam is made from high strength steel.

8. The drive axle suspension assembly according to claim 1 wherein each trailing arm has an opening and the torque rod is shrunk fit within the trailing arm openings to mount the torque rod to the trailing arms.

9. The drive axle suspension assembly according to claim 8, and further comprising an axle bracket adapted to be mounted to an axle housing, a first bushing assembly mounted to the axle bracket and shrunk fit within an opening in the trailing arm to pivotally mount the axle bracket to the trailing arm.

10. The drive axle suspension assembly according to claim 9, and further comprising a second bushing assembly adapted to be connected to a vehicle frame and shrunk-fit within an opening in the trailing arm to pivotally mount the trailing arm to the vehicle frame.

11. The drive axle suspension assembly according to claim 8, and further comprising a sleeve shrunk-fit within the opening of each trailing arm and the torque rod is shrunk-fit within each sleeve.

12. The drive axle suspension assembly according to claim 1 wherein each trailing arm assembly further comprising an axle bracket assembly adapted to mount an axle housing.

13. The drive axle suspension assembly according to claim 12 wherein each trailing arm assembly further comprising a control arm having a first end adapted to be pivotally mounted to a vehicle frame and a second end pivotally mounted to the axle bracket to form a parallelogram trailing arm assembly.

14. The drive axle suspension assembly according to claim 12 wherein each axle bracket assembly is pivotally mounted to the trailing arm at a single point of rotation.

15. The drive axle suspension assembly according to claim 12 wherein at least one of the trailing arm assemblies further comprises a linkage connecting the torque rod and adapted to be connected to a portion of a vehicle frame.

16. The drive axle suspension assembly according to claim 15 wherein the linkage comprises an arm and a link pivotally connected by a bushing assembly, the arm comprises a first portion having an opening through which the torque rod passes and a second portion having an opening in which the bushing assembly is received, and the link has one portion connected to the bushing assembly and another portion adapted to be connected to a vehicle frame.

17. The drive axle suspension assembly according to claim 16, wherein the torque rod is shrunk fit within the arm first portion opening.

18. The drive axle suspension assembly according to claim 16, and further comprising two links pivotally mounted to the bushing assembly in a spaced orientation.

19. The drive axle suspension assembly according to claim 15, and further comprising a cross plate spanning the trailing arms and spaced from the torque rod.

20. The drive axle suspension according to claim 19 wherein the cross plate is mounted to a peripheral portion of each trailing arm.

21. A drive axle trailing arm suspension assembly for supporting a drive axle relative to a vehicle frame, the drive axle comprising a differential having a pinion gear forming an angle relative to the ground and opposing drive axle housings containing axle shafts connected to the pinion gear, which is adapted to be coupled to a drive shaft for transferring torque from an engine to the axle shafts through the differential, the drive axle trailing arm suspension comprising:

a pair of trailing arm assemblies adapted to mount to opposite sides of a vehicle for supporting the drive axle housings, each trailing arm assembly comprising a trailing arm having a longitudinal axis and a first portion adapted to be mounted to the vehicle frame for pivotal movement in a generally vertical plane;

an air spring positioned between a second portion of the trailing arm and a vehicle frame for resiliently resisting the pivotal movement of the trailing arm;

a torque rod extending between the trailing arms;

each trailing arm comprising a blade-shaped beam capable of twisting about the trailing arm longitudinal axis for flexibility of the axle with respect to the vehicle frame other than in the vertical plane;

an axle bracket adapted to be mounted to the axle housing; and a first bushing assembly mounted to the axle bracket and received within an opening in the trailing arm to pivotally mount the axle bracket to the trailing arm.

22. The suspension of claim 21 wherein the first bushing assembly is shrunk-fit within the trailing arm opening.

23. The suspension of claim 21 wherein each trailing arm has an opening and the torque rod is shrunk-fit within the trailing arm openings to mount the torque rod to the trailing arms.

24. In a drive axle trailing arm suspension assembly adapted to support a drive axle comprising a differential having opposing drive axle housings containing axle shafts connected to a pinion gear, which forms an angle relative to the ground and coupled to a drive shaft transferring torque from an engine to the axle shafts through the differential, the drive axle trailing arm suspension comprising:

a pair of trailing arm assemblies adapted to mount to opposite sides of a vehicle and support the drive axle housings, each trailing arm assembly comprising a trailing arm having a longitudinal axis and a first portion adapted to be mounted to a vehicle frame for pivotal movement in a generally vertical plane, an air spring positioned between a second portion of the trailing arm and a vehicle frame for resiliently resisting the pivotal movement of the trailing arm, and a torque rod extending between the trailing arms, the drive axle mounted to the trailing arm between the first and second portions of the trailing arm, the improvement comprising:

each trailing arm comprising a blade-shaped beam capable of twisting about the trailing arm longitudinal axis for flexibility of the axle with respect to the vehicle frame other than in the vertical plane;

an axle bracket adapted to be mounted to one of the axle housings; and a first bushing assembly mounted to the axle bracket and shrunk-fit within an opening in the trailing arm to pivotally mount the axle bracket to the trailing arm.

25. The drive axle suspension assembly according to claim 24, and further comprising a second bushing assembly adapted to be connected to a vehicle frame and shrunk-fit within an opening in the trailing arm to pivotally mount the trailing arm to the vehicle frame.

26. The drive axle suspension assembly according to claim 24, and further comprising a sleeve shrunk-fit within an opening in each trailing arm and the torque rod is shrunk-fit within each sleeve.

27. The drive axle suspension assembly according to claim 24 wherein each trailing arm assembly further comprising a control arm having a first end adapted to be pivotally mounted to a vehicle frame and a second end pivotally mounted to the axle bracket to form a parallelogram trailing arm assembly.

28. The drive axle suspension assembly according to claim 24 wherein at least one of the trailing arm assemblies further comprises a linkage connecting the torque rod and adapted to be connected to a portion of a vehicle frame.

29. The drive axle suspension assembly according to claim 28 wherein the linkage comprises an arm and a link pivotally connected by a bushing assembly, the arm comprises a first portion having an opening through which the torque rod passes and a second portion having an opening in which the bushing assembly is received, and the link has one portion connected to the bushing assembly and another portion adapted to be connected to a vehicle frame.

30. The drive axle suspension assembly according to claim 24, and further comprising a cross plate spanning the trailing arms and spaced from the torque rod.

* * * * *